United States Patent
Bhimani et al.

(10) Patent No.: US 10,901,907 B2
(45) Date of Patent: Jan. 26, 2021

(54) SYSTEM AND METHOD FOR IDENTIFYING HOT DATA AND STREAM IN A SOLID-STATE DRIVE

(71) Applicant: Samsung Electronics Co., Ltd., Suwon-si (KR)

(72) Inventors: Janki Bhimani, Billerica, MA (US); Rajinikanth Pandurangan, Fremont, CA (US); Vijay Balakrishnan, Mountain View, CA (US); Changho Choi, San Jose, CA (US)

(73) Assignee: Samsung Electronics Co., Ltd.

( * ) Notice: Subject to any disclaimer, the term of this patent is extended or adjusted under 35 U.S.C. 154(b) by 262 days.

(21) Appl. No.: 15/895,797

(22) Filed: Feb. 13, 2018

(65) Prior Publication Data

US 2019/0121742 A1    Apr. 25, 2019

Related U.S. Application Data

(60) Provisional application No. 62/574,643, filed on Oct. 19, 2017.

(51) Int. Cl.
*G06F 12/0888* (2016.01)
*G06F 12/0893* (2016.01)
(Continued)

(52) U.S. Cl.
CPC ...... *G06F 12/0888* (2013.01); *G06F 12/0893* (2013.01); *G06F 12/1045* (2013.01);
(Continued)

(58) Field of Classification Search
None
See application file for complete search history.

(56) References Cited

U.S. PATENT DOCUMENTS 6,484,235 B1    11/2002    Horst et al.
7,937,535 B2    5/2011    Ozer et al.
(Continued)

FOREIGN PATENT DOCUMENTS

JP    2006235960 A    9/2006
JP    5 723812 B2    5/2015
(Continued)

OTHER PUBLICATIONS

Dharmapurikar et al., Longest Prefix Matching Using Bloom Filters, SIGCOMM'03, Aug. 25-29, 2003, Karlsruhe, Germany, Proceedings of the 2003 conference on Applications, technologies, architectures, and protocols for computer communications, pp. 201-212. URL: https://www.arl.wustl.edu/projects/fpx/sigcomm03.pdf.

(Continued)

*Primary Examiner* — Wilson Lee
(74) *Attorney, Agent, or Firm* — Innovation Counsel LLP

(57) ABSTRACT

A method for providing a Bloom filter for a multi-stream enabled solid-state drive (SSD) is disclosed. The Bloom filter includes two Bloom filter arrays, a counter corresponding to the two Bloom filter arrays, and a masking logic. The method includes: inserting an element in one or more of the two Bloom filter arrays using a plurality of hash functions; and updating the counter based on the insertion of the element. The method further includes: updating the Bloom filter by inserting one or more additional elements in one or more of the two Bloom filter arrays and updating the counter; and masking a data stored in the Bloom filter with the one or more additional elements to pseudo delete the data using the masking logic and reduce a false positive rate of the Bloom filter.

21 Claims, 5 Drawing Sheets

(51) Int. Cl.
*G06F 12/1045* (2016.01)
*H04L 9/32* (2006.01)

(52) U.S. Cl.
CPC .......... *H04L 9/3236* (2013.01); *H04L 9/3239* (2013.01); *G06F 2212/1016* (2013.01); *H04L 2209/04* (2013.01)

(56) References Cited

U.S. PATENT DOCUMENTS

| | | | |
|---|---|---|---|
| 8,874,835 B1 | 10/2014 | Davis et al. | |
| 2005/0022009 A1* | 1/2005 | Aguilera | H04L 63/1466 726/4 |
| 2005/0108368 A1 | 5/2005 | Mohan et al. | |
| 2008/0225740 A1* | 9/2008 | Martin | H04L 43/00 370/252 |
| 2009/0046581 A1* | 2/2009 | Eswaran | H04L 41/147 370/230 |
| 2010/0031315 A1* | 2/2010 | Feng | H04L 63/1458 726/3 |
| 2010/0274893 A1* | 10/2010 | Abdelal | H04L 47/18 709/224 |
| 2011/0307447 A1* | 12/2011 | Sabaa | G06F 16/24556 707/637 |
| 2011/0307659 A1* | 12/2011 | Hans | G06F 3/0613 711/114 |
| 2012/0191900 A1 | 7/2012 | Kunimatsu et al. | |
| 2012/0254524 A1 | 10/2012 | Fujimoto | |
| 2013/0019111 A1* | 1/2013 | Martin | H04L 9/0637 713/193 |
| 2013/0318051 A1* | 11/2013 | Kumar | G06F 16/1748 707/692 |
| 2014/0222988 A1* | 8/2014 | Shlomo | H04L 67/1097 709/224 |
| 2014/0244779 A1* | 8/2014 | Roitshtein | H04L 45/748 709/213 |
| 2014/0250155 A1* | 9/2014 | Chen | G06F 16/1847 707/823 |
| 2016/0139838 A1 | 5/2016 | D'Sa et al. | |
| 2016/0179386 A1 | 6/2016 | Zhang et al. | |
| 2016/0283125 A1 | 9/2016 | Hashimoto et al. | |
| 2016/0313943 A1 | 10/2016 | Hashimoto et al. | |
| 2016/0350232 A1 | 12/2016 | Knies et al. | |
| 2017/0085441 A1* | 3/2017 | Azgin | H04L 45/306 |
| 2017/0109096 A1 | 4/2017 | Jean et al. | |
| 2017/0123666 A1 | 5/2017 | Sinclair et al. | |
| 2017/0308772 A1 | 10/2017 | Li et al. | |
| 2017/0337245 A1* | 11/2017 | Beier | G06F 16/2433 |
| 2018/0004769 A1* | 1/2018 | Markiewicz | G06F 16/14 |
| 2018/0083739 A1* | 3/2018 | Kanayama | H04L 1/1614 |
| 2018/0219790 A1* | 8/2018 | Azgin | H04L 45/54 |

FOREIGN PATENT DOCUMENTS

| | | |
|---|---|---|
| WO | 2012020544 A1 | 2/2012 |
| WO | 2015005634 A1 | 1/2015 |

OTHER PUBLICATIONS

Li et al., Per-Flow Traffic Measurement Through Randomized Counter Sharing, IEEE/ACM Transactions on Networking, vol. 20, No. 5, Oct. 2012, pp. 1622-1634. URL: https://pdfs.semanticscholar.org/aec8/602d20aa56ba5184d09fff0a10dad418c13c.pdf.

Bonomi et al., Beyond Bloom Filters: From Approximate Membership Checks to Approximate State Machines, SIGCOMM'06, Sep. 11-15, 2006, Pisa, Italy, ACM SIGCOMM Computer Communication Review, vol. 36, No. 4, pp. 1-12. URL: https://cryptosec.ucsd.edu/miscpapers/beyondbloom06.pdf.

Metwally et al., Duplicate Detection in Click Streams, WWW 2005, May 10-14, 2005, Chiba, Japan, pp. 12-21.

Prior Art Search Report, CPA Global, CPA Global Reference No. 168581, pp. 1-10.

\* cited by examiner

A: 1 0 1 1 0 0 0
B: 0 1 1 1 0 1 1

Initial Null Register:  0 0 0 0 0 0 0
Null (XOR) A:           1 0 1 1 0 0 0      ⟵  Insert A A (XOR) B =             1 1 0 0 0 1 1      ⟵  Insert B
B:                      0 1 1 1 0 1 1      ⟵  Mask B by pseudo deleting B A (XOR) B (XOR) B =     1 0 1 1 0 0 0      ⟵  Result is equal to A
                                              (After inserting and masking B
                                              still the value of A is preserved)

FIG. 2

SYSTEM AND METHOD FOR IDENTIFYING HOT DATA AND STREAM IN A SOLID-STATE DRIVE

CROSS-REFERENCE TO RELATED APPLICATION(S)

This application claims the benefits of and priority to U.S. Provisional Patent Application Ser. No. 62/574,643 filed Oct. 19, 2017, the disclosure of which is incorporated herein by reference in its entirety.

TECHNICAL FIELD

The present disclosure relates generally to a multi-stream enabled solid-state drive (SSD), more particularly, to a method for identifying hot data and stream for the SSD.

BACKGROUND

Multi-streaming enables solid-state drives (SSDs) (e.g., NAND flash-based SSDs) to place data more efficiently according to "similar" characteristics to decrease write amplification and increase performance of the SSDs. In some instances, a host system can explicitly open streams in an SSD and send write requests to different streams according to their expected lifetime. The multi-stream enabled SSD ensures that the data in a specific stream with similar lifetime are written together physically into a NAND flash space (or a NAND flash block) and separate the data with different lifetimes into different streams. Thus, an efficient stream assignment is required to use multi-stream SSD properly.

An existing application running on a host system can be modified to provide stream assignment for multi-streaming at an application layer. Modifying applications at the application layer is inefficient because it requires an action from each individual application maker. Alternatively, a process running on the host system can maintain a log of previously used data in a table or queues for stream assignment. This approach may require substantial memory, processing power, or other resources to insert, search, update, and delete data maintained in queues and tables.

A Bloom filter (BF) can be used to test a membership of a specific element within a data set. The Bloom filter is specifically designed to provide space efficiency. For example, the Bloom filter provides a query return as either "definitely not in set" or "possibly in set." In order to provide a fast query speed and low memory consumption, the Bloom filter may sometime give "false positive", i.e., even if an entry is not present in a set, the Bloom filter may respond that the entry is present. The more elements that are added to the data set, the larger the probability of the false positives.

An empty Bloom filter includes a data array of m bits that are all initially set to 0, i.e., a null data array. A total of k different hash functions may be defined, and each of the hash functions maps or hashes some set element to one or more positions in the data array by generating a uniform random distribution. The number of hash functions, k, is typically much smaller than the number of bits, m, in the data array. The number of bits, m, in the data array is typically set to be proportional to the number of elements to be added; the precise choice of k and the constant of proportionality of m may be determined by an intended false positive rate of the Bloom filter.

Thus, the Bloom filters provides a fast look-up or a fast query response compared to other data structures such as lists, queues, trees etc. However, unlike other data structures such as lists, queues, trees etc., the Bloom filter has several drawbacks. For example, the Bloom filter does not allow data deletion within the data set. Thus, as the quantity of data being hashed into a Bloom filter increases, the probability of false positives and the error rate of the false positives increase. The Bloom filter was originally proposed for applications where the amount of source data would require an impractically large amount of memory if "conventional" error-free hashing techniques were applied.

When a Bloom filter is used for stream assignment in multi-streaming applications, a false positive can be harmful. For example, with a false positive, the Bloom filter implies that even if an incoming data has never been seen before (or the incoming data is a cold data), the data can be assigned to a stream identifier (ID) as a hot data. This may result in an incorrect assignment of the data to a wrong stream. Furthermore, every time during the garbage collection, the cold data along with other hot data would be copied. Thus, high false positives can result in high internal physical writes. On the other hand, false negatives may not be as harmful as false positives for multi-stream applications because the older stream ID would be continued to be used. Thus, Bloom filters may not be used in a straight forward way for data temperature identification or stream identification.

SUMMARY

According to one embodiment, a method includes: providing a Bloom filter including two Bloom filter arrays, a counter corresponding to the two Bloom filter arrays, and a masking logic; inserting an element in one or more of the two Bloom filter arrays using a plurality of hash functions; updating the counter based on the insertion of the element; updating the Bloom filter by inserting one or more additional elements in one or more of the two Bloom filter arrays and updating the counter; and masking a data stored in the Bloom filter with the one or more additional elements to pseudo delete the data using the masking logic and reduce a false positive rate of the Bloom filter.

According to another embodiment, a solid-state drive (SSD) includes: a flash memory; a flash controller configured to interface with the flash memory; a host interface configured to interface with a host computer; and a multi-stream manager configured allocate requests to access the flash memory to a plurality of streams. The multi-stream manager includes two Bloom filter arrays, a counter corresponding to the two Bloom filter arrays, and a masking logic. The multi-stream manager is configured to: update the Bloom filter by inserting one or more additional elements in one or more of the two Bloom filter arrays and updating the counter; and mask a data stored in the Bloom filter with the one or more additional elements to pseudo delete the data using the masking logic and reduce a false positive rate of the Bloom filter.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

FIG. 2 shows an example of a masking technique for a Bloom filter, according to one embodiment;

Figure 1:
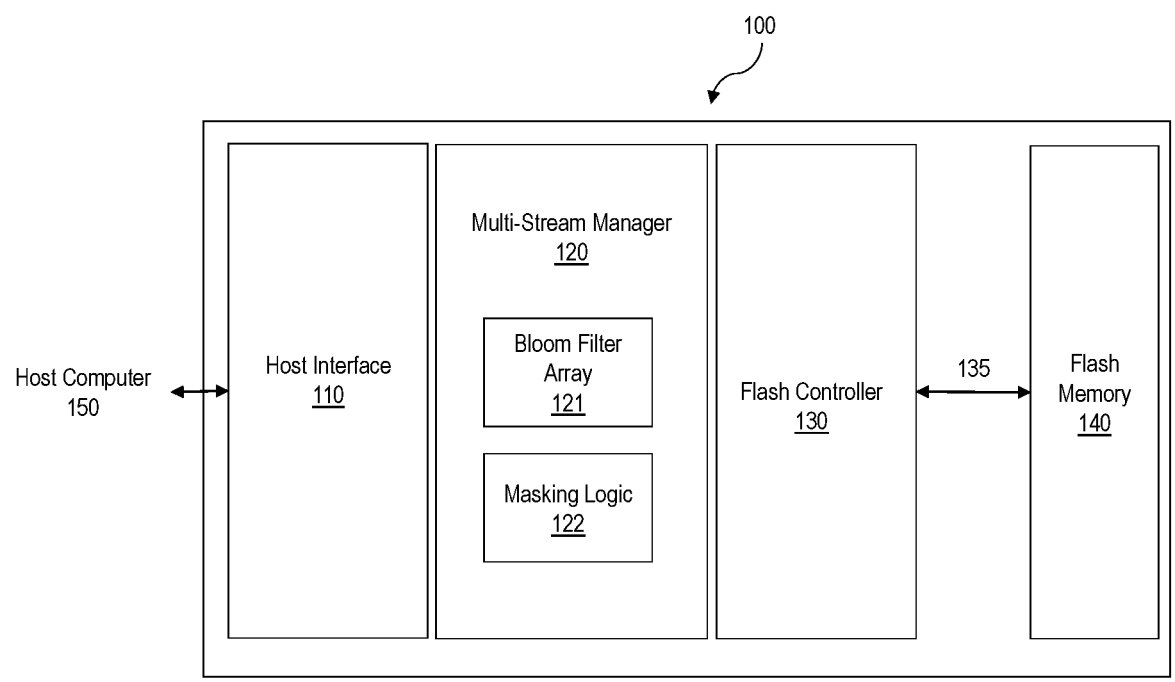
FIG. 1 shows an example solid-state drive (SSD) including a multi-stream manager, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a multi-stream enabled solid-state drive (SSD) and a method for identifying hot data and stream for the SSD. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a system using a Bloom filter for identifying data temperature and managing stream IDs of the data among a plurality of streams to allocate an access request of a host computer. According to one embodiment, the present Bloom filter includes a digital masking logic to mask a prior data stored in the Bloom filter. The present Bloom filter has a space-efficient data structure for identifying data temperature as compared to conventional data structures such as tables, queues, etc. The present Bloom filter can offer any number of categories as per its applications requirement rather than just separating data into two categories of "hot" and "cold".

Examples of the digital masking logic include, but are not limited to, an XOR gate. The masking of the prior data is effectively (but not actually) a deletion (herein also referred to as a pseudo deletion) of the prior data stored in the Bloom filter. The prior data can be temporarily "deleted" but can be restored to have the original data after the Bloom filter is inserted with another data. In this way, by pseudo deletion, the Bloom filter can accommodate a new incoming data without compromising a false positive rate. As a result, the present Bloom filter can decrease the false positive rate even if the quantity of data that is hashed into the Bloom filter increases. The prior data can be masked with any data including, but not limited to, the new incoming data, any previously received incoming data, and a user-provided masking data. Regardless of the data being used for masking the Bloom filter, the array of the Bloom filter can be restored to its original state by masking the data.

FIG. 1 shows an example solid-state drive (SSD) including a multi-stream manager, according to one embodiment. An SSD 100 includes a host interface 110 that is configured to interface with a host computer 150, a multi-stream manager 120, a flash controller 130, and a flash memory

140. The host interface 110 is configured to couple the SSD 100 with the host computer 160. The host interface 110 may be compatible with any of Peripheral Component Interconnect (PCI) Express (PCIe), serial attached SCSI (SAS), and serial AT attachment (SATA), or others known to the art. Alternatively, the SSD 100 may be coupled to the host computer 150 over a network fabric such as Ethernet, Fibre Channel, InfiniBand, and other network fabrics. In this case, the SSD 110 may be compatible with non-volatile memory express (NVMe) over fabrics (NVMe-oF), and the SSD 110 may be referred to as an Ethernet-attached SSD, or in short, an eSSD.

The multi-stream manager 120 includes a Bloom filter array 121 and a masking logic 122 to perform a masking operation to the Bloom filter array 121. The multi-stream manager 120 can allocate an access request received from the host computer 150 to an appropriate stream based on the characteristics of the access request and affinity to the stream. For example, the multi-stream manager 120 can store data having similar characteristic (e.g., invalidation times) on the same physical erase blocks of the flash memory 140 to efficiently perform garbage collection. Thus, the multi-stream manager 120 can reduce a write amplification factor (WAF) of the SSD 100. The masking logic 122 can temporarily mask a new incoming data to the Bloom filter array 121 by deleting the new incoming data. The detailed description of the masking technique by the masking logic 122 will be explained in further detail with respect to FIG. 2.

In one embodiment, the multi-stream manager 120 may be implemented in a dedicated hardware logic such as application-specific integrated chip (ASIC) or as a software or firmware implemented in a general-purpose processor or controller. In some embodiments, the multi-stream manager 120 may be integrated in the flash controller 130. The flash controller 130 can provide a flash interface 135 to the flash memory 140.

Although the multi-stream manager 120 is shown to be included in the SSD 100 in FIG. 1, it is noted that the multi-stream manager 120 can be implemented in the host computer 150 in some embodiments without deviating from the scope of the present disclosure. On a host side, the host computer 150 can establish a predetermined number of streams to access the SSD 100, for example 8 to 16 streams. In this case, the multi-stream manager 120 can identify hot data and host streams using the Bloom filter 121 from the host side, and the SSD 100 can merely interfaces with the host computer 150 via multiple streams that are established between the host computer 150 and the SSD 100 based on the data and stream identification on the host side.

When the multi-stream manager 120 is implemented within the SSD 100, an application running on the host computer 150 may not need to be changed or reauthored for implementing the multi-streaming capability. In this case, the SSD 100 can be coupled to another host computer without losing the knowledge about the Bloom filter array 121. The data temperature (hot or cold) based on the frequency of access requests may be determined within the SSD 100, thus an application running on the host computer 150 can merely access data stored in the SSD 100 without knowing that the SSD 100 is capable of the multi-streaming.

According to one embodiment, the present Bloom filter is used for identifying a hot data stored in an SSD. Further, the same Bloom filter can be used for identifying a stream ID corresponding to the hot or cold data among multiple streams in a multi-stream application. The host computer 150 can explicitly open streams in the SSD 100 and send write requests to different streams according to their expected lifetime. In this regard, the present Bloom filter used for a multi-stream application is herein also referred to as a BloomStream.

FIG. 2 shows an example of a masking technique for a Bloom filter, according to one embodiment. The Bloom filter has a data array of 7 bits. It is noted that the present Bloom filter shown in FIG. 2 is only an example, and the data array can have any number of bits without deviating from the scope of the present disclosure.

In the present example, a Bloom filter has a 7-bit array (or register). Initially, the register bits are empty, thus the array is a null register including zeros for all of the 7 bits. A new data A is inserted to the Bloom filter array using a digital XOR logic, and the Bloom filter array is updated accordingly.

Next, suppose that another data B arrives that needs to be stored in the same 7 bit array. Then, the data B is inserted to the Bloom filter array by using masking, i.e., the previous status of the Bloom filter array is XOR'ed with the newly arrived data B. In the present example, the data A has been previously inserted into the Bloom filter array, so the data B is masked over the data A, i.e., A (XOR) B. The Bloom filter array is updated accordingly with the current status that stores both the data A and the data B. The data that is inserted to the Bloom filter may be pseudo deleted by applying the XOR logic the second time. Herein, the pseudo deletion means that the data can be restored by reapplying the XOR logic second time. The Bloom filter array can be restored to its previous state (i.e., data A) that corresponds to a state prior to inserting the data B.

The present XOR masking technique allows some reuse of the Bloom filter by storing multiple data at the same bits of the Bloom filter. The number of masking and restoring cycles can occur any number of times. As long as the Bloom filter stores the history (e.g., using a counter) of inserted data, the Bloom filter can restore to its values to any previous state. For example, the present XOR masking may be used to make a space for a new incoming data and reduce a false positive rate of the Bloom filter. The Bloom filter with a lowered false positive rate may be adequately used for identifying a hot stream among a plurality of hot streams that are established between the host computer and the SSD.

According to one embodiment, the present Bloom filter having a data array of a predetermined size can be used for the multi-stream application by inserting and masking data. When a data is masked (or inserted) in the original Bloom filter array, the bits may be nullified and the original data in the Bloom filter array may get lost. In order to overcome this, the present Bloom filter includes two Bloom filter arrays and a counter. The counter stores the total combined frequency of data in both of the two Bloom filter arrays. For convenience of explanation, the example below uses two Bloom filter arrays. However, it is understood that more than two Bloom filter arrays can be used for more convenient and efficient data insertion and masking without deviating from the scope of the present disclosure.

Figure 3:
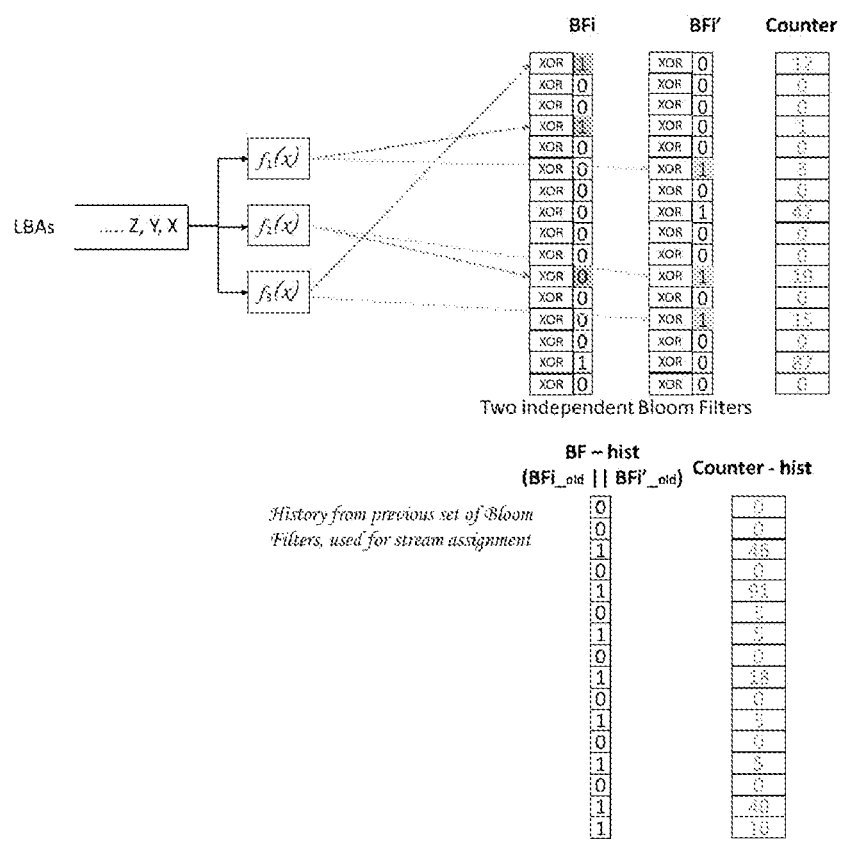
FIG. 3 shows a pictorial representation of an example Bloom filter system that includes two arrays and a counter, according to one embodiment.

FIG. 3 shows a pictorial representation of an example Bloom filter system that includes two arrays and a counter, according to one embodiment. The Bloom filter includes a first array BFi and a second array BFi'. The counter records the number of access to each bit of the arrays to designate a frequency of the corresponding bit. The two arrays BFi and BFi' are two Bloom filter arrays in which data is hashed by same hash function. In the present example, three hash functions f1, f2, and f3 are shown to indicate an example use of the present Bloom filter system; however, it is understood that any number of hash functions may be associated with the present Bloom filter system. Each hash function can set one or more bits of each of the Bloom filter arrays BFi and BFi'.

Periodically, the current state of both the Bloom filter arrays and the counter is preserved in a history data structure including a history Bloom filter and a history counter, and then the history Bloom filter and the history counter are used to assign streams. After storing the current state in the history data structure, both the Bloom filter arrays are set to null or made empty to store the new data, and the counter is restarted. The periodical copying of the Bloom filter status to the history data structure can capture recency (in addition to frequency) of data that is inserted in the Bloom filter. After a certain time interval, the Bloom filter can ignore the past data activities and move forward with a fresh Bloom filter to give more importance to current data activities. The present Bloom filter structure can not only identify a hot region of the SSD, but also detect a change of the hot region if the hot region changes over time by updating itself to accordingly assign stream IDs.

In one embodiment, the Bloom filter arrays and the counter may be periodically saved with a predetermined time interval using a timer. Alternatively, an application running on the host computer 150 or the multi-stream manager 120 may determine an opportune time for storing the Bloom filter in the history data structure. For example, the Bloom filter may switch a mode of operation and prior to switching, the Bloom filter stores a snapshot of the Bloom filter arrays and the counter so that when it returns back to the original mode, the Bloom filter can restore the Bloom filter arrays and the counter to their original states. In another example, the multi-stream manager 120 monitors the bits of the Bloom filter arrays and determines to reset the Bloom filter and the counter when the number of bits of the Bloom filter arrays exceeds a threshold. In this way, higher importance is given to more recent data than the older data by applying a decay to the history counter.

The two Bloom filter arrays BFi and BFi' are passed to perform an OR operation (BFi||BFi') between them to be stored as a history Bloom filter. All the data certainly exists in an unmasked form in one of the Bloom filter arrays. In the present example, the presence (or membership) of the certain data in the Bloom filter arrays that has high corresponding counter bits represents that the data is frequently accessed, i.e., hot data. The OR operation can determine if the data does exist in at least one of the Bloom filter arrays. The OR'ed history Bloom filter array and the history counter can indicate a specific frequency of access to a particular data stored in the SSD, and the frequency can be used for assigning a stream to access the data. The frequency of access may correspond to a time period starting from a time in which the Bloom filter arrays and the counter are reset or nullified until they are stored in the history data structure.

Referring to FIG. 1, the multi-stream manager 120 can allocate a plurality of logical address spaces (LBA spaces) that correspond to access requests received from the host computer 150 to the SSD 1000 as if the SSD includes a plurality of virtual drives. The data allocated to a specific stream by the multi-stream manager 120 may have similar characteristics such as an expected lifecycle, write sequentiality, lifespan, timing pattern, I/O size, a file type, and/or I/O traffic patterns. A write command received from the host computer 150 can include a metadata or an identifier of the requested data, and the write command can be associated with a specific stream (or allocated to a specific stream ID) among a plurality of the streams based on the metadata and/or their own characteristics.

According to one embodiment, the multi-stream manager 120 can determine a frequency of access to a data stored in a particular LBA of the SSD 1000. For example, the frequency of access to the data can be determined by a history counters value that is stored in the history data structure corresponding to the bits in the OR'ed Bloom filter array. Based on the frequency, the multi-stream manager 120 can assign the accessed LBA to a particular stream among streams that are already established between the host computer 150 and the SSD 1000.

Next, details of algorithmic implementation for the Bloom filter regarding data insertion and retrieval of stream ID for data, and an update of a history counter will be described. It is understood that the present Bloom filter can be used for caching, tiering etc. to efficiently capture hotness of data and make decisions based on the data temperature information. The following routines show how stream assignment is enabled in a multi-stream enabled SSD.

The multi-stream manager includes a submission queue to store entries received from the host computer. The Insert Bloom Filter routine, herein referred to as INSERT_BF( ), is used to insert an entry Xi from the submission queue into the Bloom filter. One of the two Bloom filter arrays is appointed as the current Bloom filter and data inserts are first attempted to this current Bloom filter. When the data to be stored arrives, the data is hashed to identify bits in the Bloom filter. Then, the hashed data is attempted to be stored in the current Bloom filter (out of BF and BF'). If the current Bloom filter already has that data, the other Bloom filter becomes the current Bloom filter, and the data is masked onto the new current Bloom filter. The corresponding counter bits are incremented. The above procedure of inserting is given by Algorithm 1 INSERT_BF( ) below. With this process of inserting the data, it is ensured that one of the Bloom filter arrays contains a clean (i.e., unmasked) copy of data at all time.

| Algorithm 1 INSERT_BF( ) |
| --- |
| 1: procedure INSERT(Xi) |
| 2:   / * get one entry from submission queue (e.g. Xi) |
| 3:   while NOT in BF - hist do |
| 4:     /*hash the entry*/ |
| 5:     if NOT in BFi then |
| 6:       XOR Xi |
| 7:       update_BFi [f(Xi)] |
| 8:       Increment corresponding Counter bits |
| 9:     else if NOT in BFi' then |
| 10:       XOR Xi |
| 11:       update_BFi [f(Xi)] |
| 12:       Increment corresponding Counter bits |
| 13:     else |
| 14:       / * Mask over any one copy * / |
| 15:       XOR Xi |
| 16:       update_BFi [f(Xi)] |
| 17:       Increment corresponding Counter bits |
| 18: return |

Another important operation of the multi-stream manager is to determine a stream ID of data from the Bloom filter structure. Get Stream Bloom Filter routine, herein referred to as GET_STREAM_BF( ) is used to obtain a stream ID from the Bloom filter. The stream ID can be determined depending on the history counter value for hashed bits of the data in the history Bloom filter. Data is hashed to multiple bits in the Bloom filter. The index of the bit having minimum frequency count is identified. If this bit is set, then the data has been seen by the Bloom filter, and the counter value corresponding to that bit indicates the relative frequency of that data. Then using the frequency factor derived by history counter, the stream ID can be obtained applying function $f$. If the bit is null, the data has never seen before and does not exists in the Bloom filter.

---
Algorithm 2 GET_STREAM_BF( )
---
1: procedure GET STREAM BF(Xi)
2:  while In BF - hist do
3:     get Index of the Min of all the bits for Xi in Counter-hist
4:     if Index in BFi then
5:        freq = Counter-hist(Index)
6:        maxFreq = Max(Counter-hist( ))
7:        maxStream = get Max Streams supported
8:        StreamID = f(freq, maxStream, maxFreq)
9:  return StreamID
---

Here, the function $f$ in line 8 of the GET_STREAM_BF routine represents a generic function that can be derived from basic math operations. The function $f$ may vary depending on where and how the data structure of the present Bloom filter is applied. For example, the following exemplary functions fun1, fun2, and fun3 may be used to get a stream ID in a multi-stream enabled SSD.

```
fun1 = (freq * maxStream) / maxFreq;
fun2 = ln (freq) + ln(maxStream) − ln(maxFreq);
fun3 (freq, maxStream)
{
  x = ln (freq);
  while (x > maxStream)
  {
    f(x, maxStream);
  }
  return x;
}.
```

Update history routine, herein referred to as UPDATE_HIST( ), is used to update the history data structure of the Bloom filter using an entry Xi. As stated earlier, periodically the current state of both the Bloom filters and the counter is preserved as the "history Bloom filter" and the "history counter," and the history Bloom filter and the history counter are used to assign streams. An example of this transition is shown by Algorithm 3 below. The history Bloom filter is constructed by an OR operation of both of the Bloom filter arrays and the previous history Bloom filter status. In the present example, a decay factor of 2 is used for the frequency count stored in the counter for each time interval. Thus, at every interval, the value of current counter is added to the decayed value of the history counter. If the cumulative counter is null for any bit, it indicates that that data had been once hot and then became very cold. In this case, whenever the cumulative counter value is null, the Bloom filter value of the corresponding bit is also set to null to maintain consistency.

---
Algorithm 3 UPDATE_BF_HIST( )
---
1:  procedure UPDATE BF HIST(Xi)
2:    while timestamp > INTERVAL do
3:      / * After every fixed time ineterval * /
4:      if at any index $\frac{\text{Counter} - \text{hist\_prev}( )}{2}$ is NULL then
5:        at that index set BF-hist_prev as NULL
6:        BF-hist = BF-hist_prev || BFi || BFi'
7:        $\text{Counter-hist}( ) = \frac{\text{Counter} - \text{hist\_prev}( )}{2} + \text{Counter}( )$
8:        BFi = NULL
9:        BFi' = NULL
10:       Counter( ) = NULL
11:   return BFi, BFi', Counter
---

Figure 4:
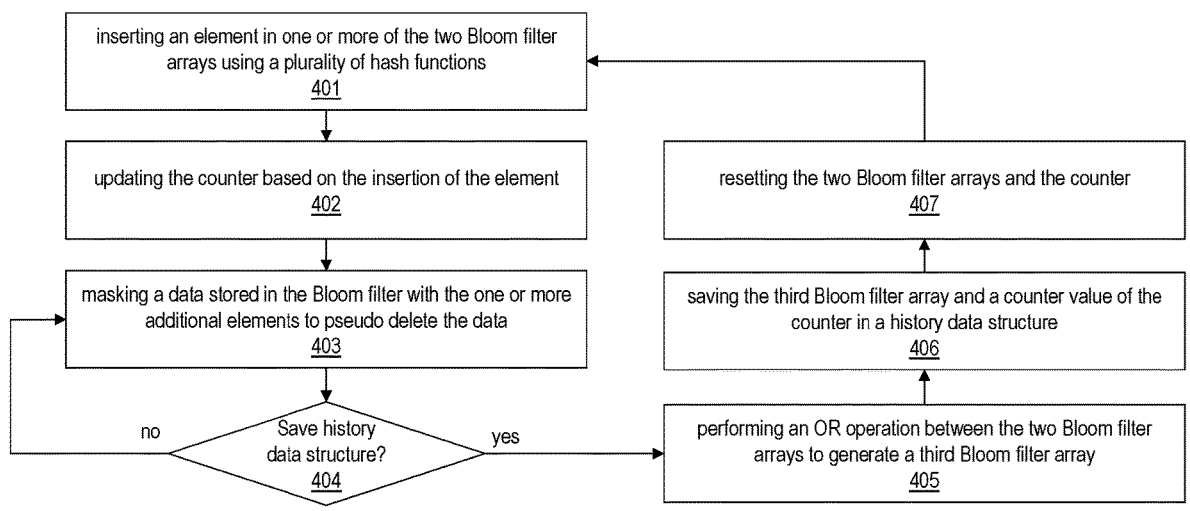
FIG. 4 shows a flowchart for operating an example Bloom filter for masking data, according to one embodiment.

FIG. 4 shows a flowchart for operating an example Bloom filter for masking data, according to one embodiment. The multi-stream manager 120 operates a Bloom filter including two Bloom filter arrays, a counter corresponding to the two Bloom filter arrays, and a masking logic. The multi-stream manager 120 inserts an element in one or more of the two Bloom filter arrays using a plurality of hash functions (401) and updates the counter based on the insertion of the element (402). The multi-stream manager 120 further updates the Bloom filter by inserting one or more additional elements in one or more of the two Bloom filter arrays and updating the counter by masking a data stored in the Bloom filter with the one or more additional elements to pseudo delete the data using the masking logic and reduce a false positive rate of the Bloom filter (403). The multi-stream manager 120 determines whether to save the Bloom filter data and the counter value in a history data structure (404). For example, the saving of the Bloom filter data and the counter value may occur periodically, after switching a mode of operation of the Bloom filter, or when a number of bits of the two Bloom filter arrays exceeds over a threshold.

When the multi-stream manager 120 determines to save the Bloom filter data and the counter value in the history data structure, the multi-stream manager 120 performs an OR operation between the two Bloom filter arrays to generate a third Bloom filter array (405) and save the third Bloom filter array and a counter value of the counter (406). After saving, the multi-stream manager 120 resets the two Bloom filter arrays and the counter (407) and continues the process of inserting data elements into the Bloom filter arrays and update the counter accordingly.

Figure 5:
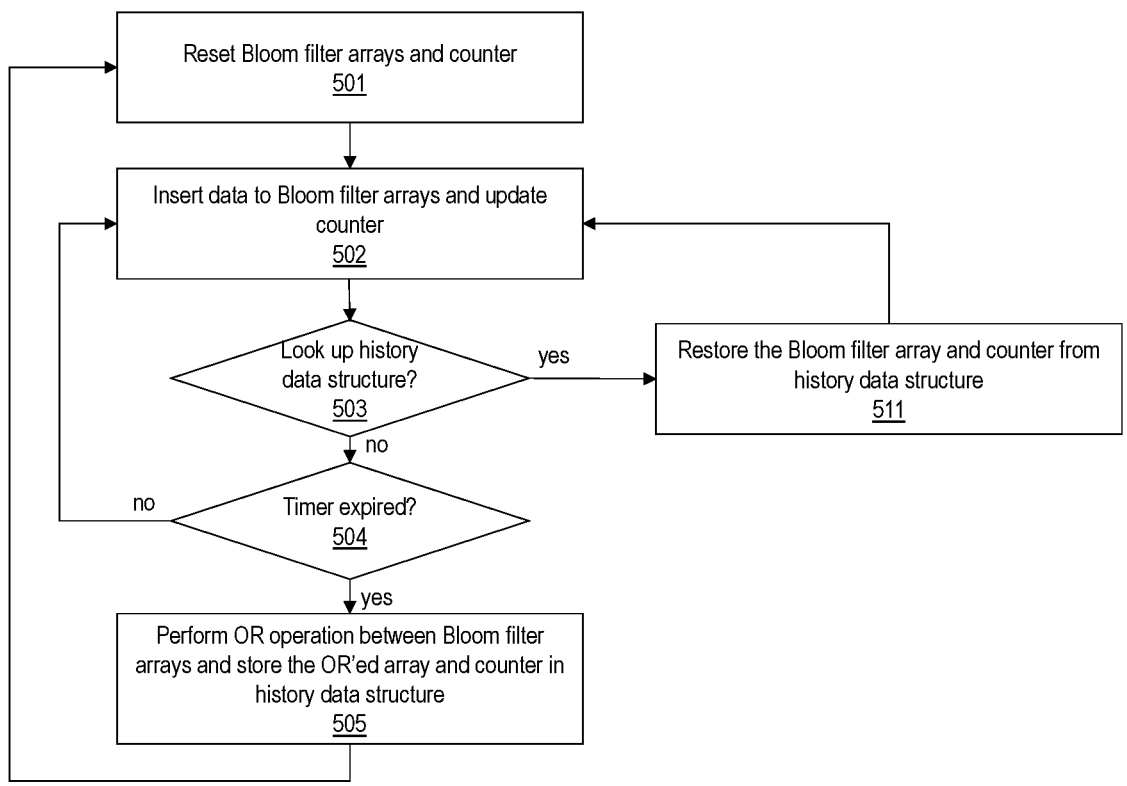
FIG. 5 shows a flowchart for operating an example Bloom filter for identifying a stream identifier in a multi-stream SSD, according to one embodiment.

FIG. 5 shows a flowchart for operating an example Bloom filter for identifying a stream identifier in a multi-stream SSD, according to one embodiment. The multi-stream manager 120 resets the Bloom filter arrays and the counter (501). When the Bloom filter first starts (e.g., the SSD is new or a new application starts on the host computer 150) or is reset, the Bloom filter arrays are null arrays, and the counter includes zeros. The multi-stream manager 120 can insert data to the Bloom filter arrays and update the counter using one or more hash functions and the masking logic 122 (502). If a look up to the history data structure is required (503), the multi-stream manager 120 can restore the Bloom filter array and the counter from the history data structure (511). Otherwise, a timer for resetting the Bloom filter expires (504), the multi-stream manager 120 performs an OR operation between the two Bloom filter arrays and stores the OR'ed filter array and the corresponding counter in the history data structure (505). The process repeats as the Bloom filter resets to accommodate new incoming data while reducing a false positive rate. When requested, the Bloom filter can restore to a previous state using the history data structure.

According to one embodiment, a method includes: providing a Bloom filter including two Bloom filter arrays, a counter corresponding to the two Bloom filter arrays, and a masking logic; inserting an element in one or more of the two Bloom filter arrays using a plurality of hash functions; updating the counter based on the insertion of the element; updating the Bloom filter by inserting one or more additional elements in one or more of the two Bloom filter arrays and updating the counter; and masking a data stored in the Bloom filter with the one or more additional elements to pseudo delete the data using the masking logic and reduce a false positive rate of the Bloom filter.

The method may further include: performing an OR operation between the two Bloom filter arrays to generate a third Bloom filter array; and saving the third Bloom filter array and a counter value of the counter in a history data structure.

The third Bloom filter array and the counter value may be saved in the history data structure periodically.

The third Bloom filter array and the counter value may be saved in the history data structure prior to switching a mode of operation of the Bloom filter.

The third Bloom filter array and the counter value may be saved in the history data structure when a number of bits of the two Bloom filter arrays exceeds over a threshold.

The counter value may indicate a frequency of access to data stored in a solid-state drive (SSD) at an address identified by the plurality of hashing functions.

The SSD may include a flash memory and a flash controller configured to interface the flash memory.

The method may further include: identifying a stream among a plurality of streams that are established to access to the SSD based on the frequency of access.

The method may further include: testing the third Bloom filter array using a plurality of test functions to determine the frequency of access to the data corresponding to an access request to the SSD that is received from a host computer based on the counter value of the counter; and accessing the data stored in the SSD via the stream among the plurality of streams.

The method may further include: resetting the two Bloom filter arrays and the counter after saving the third Bloom filter and the counter value of the counter in the history data structure.

The two Bloom filter arrays may be managed and used independently from each other.

According to another embodiment, a solid-state drive (SSD) includes: a flash memory; a flash controller configured to interface with the flash memory; a host interface configured to interface with a host computer; and a multi-stream manager configured allocate requests to access the flash memory to a plurality of streams. The multi-stream manager includes two Bloom filter arrays, a counter corresponding to the two Bloom filter arrays, and a masking logic. The multi-stream manager is configured to: update the Bloom filter by inserting one or more additional elements in one or more of the two Bloom filter arrays and updating the counter; and mask a data stored in the Bloom filter with the one or more additional elements to pseudo delete the data using the masking logic and reduce a false positive rate of the Bloom filter.

The multi-stream manager may be further configured to generate the third Bloom filter array by performing an OR operation between the two Bloom filter arrays and store a third Bloom filter array corresponding to at least one of the two Bloom filter arrays and a counter value of the counter in a history data structure.

The multi-stream manager may be further configured to save the third Bloom filter array and the counter value in the history data structure periodically.

The multi-stream manager may be further configured to save the third Bloom filter array and the counter value in the history data structure prior to switching a mode of operation of the Bloom filter.

The multi-stream manager may be further configured to save the third Bloom filter array and the counter value in the history data structure when a number of bits of the two Bloom filter arrays exceeds over a threshold.

The counter value may indicate a frequency of access to data stored in the solid-state drive at an address identified by the plurality of hashing functions.

The multi-stream manager may be further configured to identify a stream among a plurality of streams that are established to access to the SSD based on the frequency of access.

The multi-stream manager may be further configured to: test the third Bloom filter array using a plurality of test functions to determine the frequency of access to the data corresponding to an access request to the SSD that is received from a host computer based on the counter value of the counter; and access the data stored in the SSD via the stream among the plurality of streams.

The multi-stream manager may manage the two Bloom filter arrays independently.

The multi-stream manager may be configured to reset the two Bloom filter arrays and the counter after saving the third Bloom filter and the counter value of the counter in the history data structure.

The above example embodiments have been described hereinabove to illustrate various embodiments of implementing a system and method for providing a multi-stream enabled solid-state drive (SSD) and a method for identifying hot data and stream for the SSD. Various modifications and departures from the disclosed example embodiments will occur to those having ordinary skill in the art. The subject matter that is intended to be within the scope of the invention is set forth in the following claims.

What is claimed is:

1. A computer-implemented method comprising:
receiving an access request to access a data storage device from a host computer via a host interface of the data storage device;
inserting an element included in the access request in one or more of two Bloom filter arrays of a Bloom filter using a hash function;
updating a counter of the Bloom filter based on the insertion of the element;
updating the Bloom filter by inserting an additional element in one or more of the two Bloom filter arrays and updating the counter;
masking a data stored in the Bloom filter with the additional element to delete the data using a masking logic of the Bloom filter and reduce a false positive rate of the Bloom filter;
determining characteristics of the data associated with the access request using the Bloom filter;
assigning a plurality of streams to access the data storage device;
identifying a stream among the plurality of streams based on the characteristics of the data;
allocating the access request to the stream; and
accessing the data storage device via the stream over a memory interface of the data storage device, wherein the data that is deleted is restorable by reapplying the masking logic.

2. The computer-implemented method of claim 1, further comprising:
performing an OR operation between elements of the two Bloom filter arrays to generate a third Bloom filter array; and
saving the third Bloom filter array and a counter value of the counter in a history data structure.

3. The computer-implemented method of claim 2, wherein the third Bloom filter array and the counter value are saved in the history data structure periodically.

4. The computer-implemented method of claim 2, wherein the third Bloom filter array and the counter value are saved in the history data structure based on a mode of operation of the Bloom filter.

5. The computer-implemented method of claim 2, wherein the third Bloom filter array and the counter value are saved in the history data structure based on a number of bits of the two Bloom filter arrays exceeding a threshold.

6. The computer-implemented method of claim 1, wherein the counter value indicates a frequency of access to data stored in the data storage device at an address identified by the hash function.

7. The computer-implemented method of claim 6, wherein the data storage device includes a flash memory and a flash controller that provides the memory interface to the flash memory.

8. The computer-implemented method of claim 6, further comprising: identifying the stream among the plurality of streams based on the frequency of access.

9. The computer-implemented method of claim 8, further comprising:
testing the third Bloom filter array using a test function to determine the frequency of access to the data corresponding to the access request to the data storage device that is received from the host computer based on the counter value of the counter; and
accessing the data stored in the data storage device via the stream among the plurality of streams.

10. The computer-implemented method of claim 2, further comprising: resetting the two Bloom filter arrays and the counter based on saving the third Bloom filter and the counter value of the counter in the history data structure.

11. The computer-implemented method of claim 1, wherein the two Bloom filter arrays are managed and used independently from each other.

12. A data storage device comprising:
a flash memory;
a flash controller configured to interface with the flash memory;
a host interface configured to interface with a host computer; and
a multi-stream manager configured to allocate an access request to access the flash memory to a stream,
wherein the multi-stream manager includes two Bloom filter arrays, a counter corresponding to the two Bloom filter arrays, and a masking logic,
wherein the multi-stream manager is configured to:
update the Bloom filter by inserting one or more additional elements in one or more of the two Bloom filter arrays and updating the counter;
mask a data stored in the Bloom filter with the one or more additional elements to delete the data using the masking logic and reduce a false positive rate of the Bloom filter;
determine characteristics of the data associated with the access request using the Bloom filter;
assign a plurality of streams to access the data storage device;
identify the stream among the plurality of streams based on the characteristics of the data;
allocate the access request to the stream; and
access the data storage device via the stream,
wherein the data that is deleted is restorable by reapplying the masking logic.

13. The data storage device of claim 12, wherein the multi-stream manager is further configured to generate the third Bloom filter array by performing an OR operation between elements of the two Bloom filter arrays and store a third Bloom filter array corresponding to at least one of the two Bloom filter arrays and a counter value of the counter in a history data structure.

14. The data storage device of claim 13, wherein the multi-stream manager is further configured to save the third Bloom filter array and the counter value in the history data structure periodically.

15. The data storage device of claim 13, wherein the multi-stream manager is further configured to save the third Bloom filter array and the counter value in the history data structure based on a mode of operation of the Bloom filter.

16. The data storage device of claim 13, wherein the multi-stream manager is further configured to save the third Bloom filter array and the counter value in the history data structure based on a number of bits of the two Bloom filter arrays exceeding a threshold.

17. The data storage device of claim 12, wherein the counter value indicates a frequency of access to data stored in the data storage device at an address identified by the hash function.

18. The data storage device of claim 17, wherein multi-stream manager is further configured to identify the stream among the plurality of streams that are configured to access to the data storage device based on the frequency of access.

19. The data storage device of claim 18, wherein the multi-stream manager is further configured to:
test the third Bloom filter array using a test function to determine the frequency of access to the data corresponding to an access request to the data storage device that is received from the host computer based on the counter value of the counter; and
access the data stored in the data storage device via the stream among the plurality of streams.

20. The data storage device of claim 12, wherein the multi-stream manager manages the two Bloom filter arrays independently.

21. The data storage device of claim 13, wherein the multi-stream manager is configured to reset the two Bloom filter arrays and the counter based on saving the third Bloom filter and the counter value of the counter in the history data structure.

* * * * *